J. Lebeau,
Fruit Knife.
No. 56,235. Patented July 10, 1866.

Attest,
Inventor,
Jacob Lebeau
By Knight Bro.
att'ys

UNITED STATES PATENT OFFICE.

JACOB LEBEAU, OF CINCINNATI, OHIO.

IMPROVEMENT IN PARING-KNIVES.

Specification forming part of Letters Patent No. 56,235, dated July 10, 1866.

*To all whom it may concern:*

Be it known that I, JACOB LEBEAU, of Cincinnati, Hamilton county, Ohio, have invented a new and useful Paring-Knife; and I do hereby declare the following to be a full, clear, and exact description thereof, reference being had to the accompanying drawings, making part of this specification.

My invention relates to a peculiarly-shaped knife adapted to pare the skin off of apples, potatoes, &c., and to remove the cores, eyes, and other refuse portions from any kind of fruit or vegetables, and also adapted to slice the same.

Figure 1:
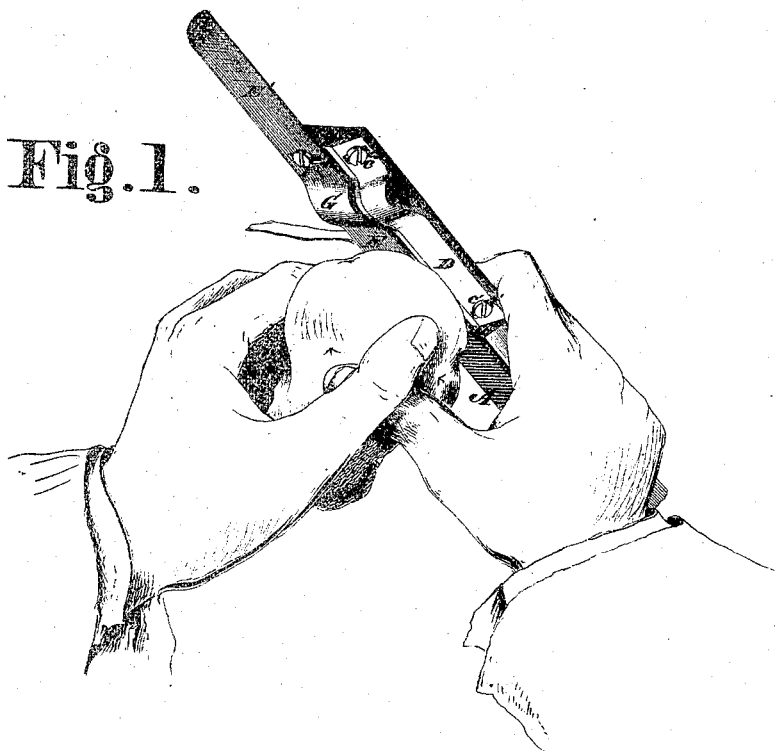
Figure 2:
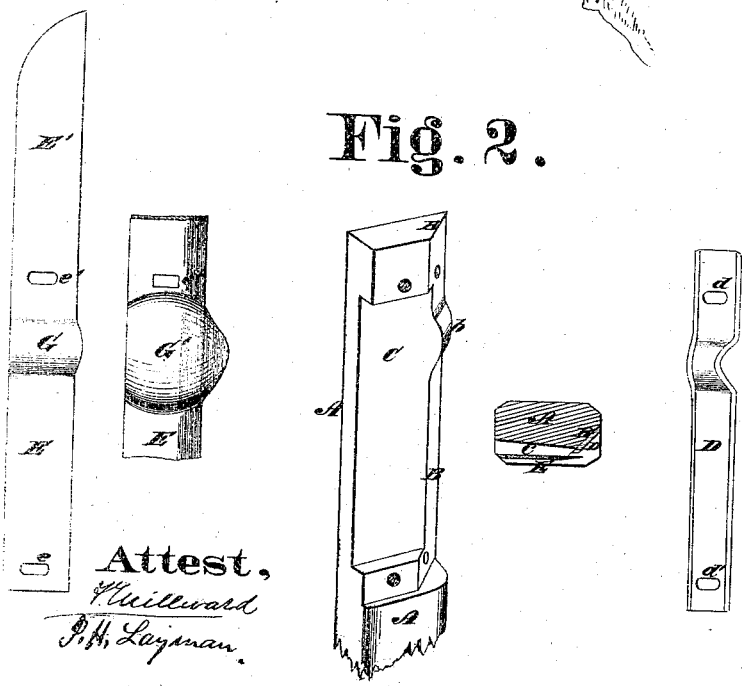

In the accompanying drawings, Figure 1 shows my paring-knife when used for peeling potatoes, and Fig. 2 represents the different parts of my knife detached from each other.

A represents the handle of my knife, having a chamfered edge, B, and a recessed portion, C. The chamfered part B, instead of being a continuous straight edge, is provided with a convex projection, $b$, and said chamfered edge is covered with an adjustable gage or mouth-piece, D, of corresponding shape.

The gage D is adapted to be set so as to allow of a greater or less width of slot between it and the knife by means of the set-screws $c$ $c'$, which, passing through the slots $d$ $d'$, enter the handle A.

E is a blade provided with slots $e$ $e'$ and set-screws F F', and this blade projects some distance beyond the end of the handle A, as shown at E'. The blade E is furnished with a swell or scoop, G, and when the knife is attached to the handle this swell is opposite the projection $b$, thereby producing a uniform width of slot between the knife and gage D.

For peeling potatoes I prefer the knife as shown in Fig. 1; but for coring apples, &c., the scoop may have the form shown at G'.

A thicker or thinner cut may be produced by simply setting the gage to or from the knife, and when the latter becomes worn by frequent use and sharpening the screws F F' and slots $e$ $e'$ enable its readjustment at any time.

That portion of the blade which projects beyond the handle, as at E', is for the purpose of slicing up the fruit or vegetables.

I have selected for illustration the form successfully tested by me, but do not desire to restrict the invention thereto, so long as the essential characteristics of my invention are secured by means substantially equivalent. For example, the portion E', or even one of the portions E, G, or D, may be omitted, and the instrument still be serviceable in an inferior degree, or for a portion of the work, or the parts E and G may be fixed instead of adjustable.

I claim herein as new and of my invention—

1. The combination of the handle A B and blade E, when the latter is adjustable on the former in its own plane, substantially as and for the purposes set forth.

2. The combination of the gage-piece D with the handle A B and blade E, substantially as and for the purposes set forth.

3. The scoop G, in combination with the blade E and handle A B, as and for the purposes specified.

In testimony of which invention I hereunto set my hand.

JACOB LEBEAU.

Witnesses:
 GEO. H. KNIGHT,
 JAMES H. LAYMAN.